United States Patent Office 3,530,192
Patented Sept. 22, 1970

3,530,192
SYNTHESIS OF POLYCHLOROBENZAL CHLORIDE
Charles F. Kohll and Nanno Fekkes, Amsterdam, Netherlands, assignors to Shell Oil Company, New York, N.Y., a corporation of Delaware
No Drawing. Filed Dec. 11, 1967, Ser. No. 689,308
Int. Cl. C07c 25/00, 25/14
U.S. Cl. 260—651
10 Claims

ABSTRACT OF THE DISCLOSURE

Preparation of polychlorobenzal chloride having at least one ortho chlorine by chlorinating certain substituted toluenes in the presence of catalytic amounts of a hetero-aromatic nitrogen base and an inorganic phosphorus compound at elevated temperatures.

BACKGROUND OF THE INVENTION

Field of the invention

The present invention is a process for preparation of polychlorobenzal chlorides which are useful in the synthesis of biocides, especially herbicidal derivatives of 2,6-dichlorobenzoic acid such as 2,6-dichlorobenzonitrile and 2,6-dichlorothiobenzamide.

Description of the prior art

Processes for preparation of polychlorobenzal chlorides are known in the art. For example, 6-chloro-2-nitrotoluene has been reacted with gaseous chlorine at elevated temperatures in the presence of a tertiary amine yielding a mixture of chiefly 2,6-dichlorobenzal chloride and smaller amounts of 2,6-dichlorobenzonitrile; see U.K. patent specification No. 993,204.

A similar process using phosphorus trichloride as a catalyst is described in U.K. patent specification No. 953,554. The process does not employ a nitrogen base.

Both of these processes leave much to be desired as regards the yields of polychlorobenzal chlorides and other derivatives of 2,6-dichlorobenzoic acid convertible into the herbicidal derivatives of 2,6-dichlorobenzoic acid.

SUMMARY OF THE INVENTION

The present invention comprises preparation of polychlorobenzal chloride having at least one ortho chlorine by chlorinating certain substituted toluenes in the presence of catalytic amounts of a hetero-aromatic nitrogen base and an inorganic phosphorus compound at elevated temperatures.

Surprisingly, it has been found that the simultaneous presence of a hetero-aromatic nitrogen base and an inorganic compound of phosphorus in the chlorination of certain substituted toluenes catalysis the chlorination resulting in appreciably higher yields of the desired polychlorobenzal chlorides than the prior art has indicated possible.

Additional advantages of the present invention are the formation of a much smaller quantity of high-boiling residue than possible with the prior art processes, a much higher chlorination rate than indicated in the prior art and the use of a much smaller amount of the catalyst of the invention compared to the amount of catalysts used in the prior art.

DESCRIPTION OF THE PREFERRED EMBODIMENTS

The process of the invention comprises chlorinating in liquid phase a compound of the formula

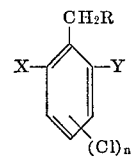

wherein R is hydrogen, chlorine and lower alkyl of up to 5 carbon atoms, X is chlorine or nitro, Y is chlorine, fluorine, bromine, methoxy, methyl, nitro or cyano, and $n$ is 0 or 1, in the presence of a catalytic amount of one or more hetero-aromatic nitrogen bases of up to 9 carbon atoms and of one or more phosphorus compounds selected from phosphorus halides, phosphorus oxyhalides and acids of phosphorus at elevated temperatures to yield a compound of the structure

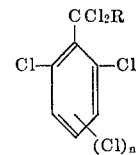

wherein R and $n$ are as described above.

In the above formula when R is lower alkyl, it is preferably non-tertiary. Therefore, examples of the substituent $CH_2R$ includes methyl, ethyl, propyl, isopropyl, n-hexyl and chloromethyl with the methyl group (where R is hydrogen) being preferred.

A chlorine atom or nitro group must be present in at least one ortho-position in relation to the group $CH_2R$. Excellent results are obtained when a halogen atom such as chlorine, fluorine or bromine is also present in the remaining ortho-position in relation to the group $CH_2R$. Other suitable nuclear substituents ortho to the $CH_2R$ group include methoxy, methyl and cyano groups. Also, a chlorine atom may be substituted on other positions of the aromatic nucleus.

Examples of such starting materials are: 2,6-dichlorotoluene, 2,3,6-trichlorotoluene, 2,6-dichlorobenzyl chloride, 2,6-dinitrotoluene, 2-chloro-6-nitro-n-hexylbenzene, 2,6-dichloro-1-chloromethylbenzene, 2,3-dichloro-6-nitrotoluene, and 6-chloro-2-nitrotoluene. The last-mentioned compound, in particular, has proved to be eminently suitable. These starting materials are either available commercially or readily synthesized from commercial compounds by methods well known in the art.

The starting material which is to be chlorinated is preferably used in liquid form, i.e., in the molten state or as a solution. In the latter case, solvents well known in the art may be employed, such as fluorinated or chlorinated hydrocarbons, or chlorinated aromatic compounds such as o-dichlorobenzene and 1,2,4-trichlorobenzene. The amount of solvent, if present, may be small and need not, as a rule, exceed 20% by weight of the reaction mixture. Enough solvent should be present to insure a readily fluid or liquid reaction mixture.

An essential requirement of the invention is the presence during the chlorination reaction of catalytic amounts of one or more hetero-aromatic nitrogen bases and of one or more inorganic compounds of phosphorus.

The tetero-aromatic nitrogen base preferably contains no more than 9 carbon atoms and includes tertiary heterocyclic amines. Examples of such include N-methylpyrrole, thiazole, N-methylimidazole, indole and derivatives thereof.

Especially preferred are heterocyclic amines of up to 9 carbon atoms containing a pyridine nucleus in the molecule, such as pyridine; homologues of pyridine including picolines, lutidines, and collidine; substitution products of pyridine, for example 3-chloro-pyridine and annulated pyridine derivatives such as quinoline and derivatives thereof. Most preferred are pyridine, the picolines and quinoline, with the best results being obtained with pyridine. Use of mixtures of the above nitrogen bases is also within this invention.

The amount of hetero-aromatic nitrogen base used need not exceed 0.02 mole per mole of the starting compounds. Preferred are amounts of 0.005 mole to 0.012 mole of nitrogen base per mole of the starting compound.

The other compound of the catalytic mixture is an inorganic compound of phosphorus. Examples of such include the halides, oxyhalides, and acids of phosphorus, such as $PCl_2$, $PCl_5$, $POCl_2$, and $H_3PO_4$. Inorganic compounds are usually preferred. Also preferred are compounds derived from phosphorus in the pentavalent state, notably $PCl_5$, $PCl_3$, and $H_3PO_4$, the last compound being particularly preferred. The phosphoric acid need not necessarily be employed in an anhydrous form. Small amounts of water may be tolerated. Thus, excellent results are obtained using an aqueous $H_3PO_4$ which may contain, for example, 85 to 95% by weight $H_3PO_4$. Mixtures of the above phosphorus compounds are also workable within the invention.

According to the invention, the amount of the phosphorus compound must not be larger than 0.05 mole per mole of the starting material. Suitable amounts are as a rule, below 0.02 mole and, in particular, below 0.01 mole of the phosphorus compound per mole of the starting compound. Optimum results have been obtained with amounts of from 0.002 to 0.006 mole of the phosphorus compound per mole of the starting compound.

The relative proportions in which the compounds of the catalytic mixture are employed may vary within wide limits. Molar ratios of heteroaromatic nitrogen base to phosphorus compound generally range from 1:10 to 10:1, preferably from 1:2 to 6:1. Molar ratios ranging from 2:1 to 4:1 have proved to be especially preferred.

The components of the catalytic mixture, i.e. one or more heteroaromatic nitrogen bases on the one hand and one or more phosphorus compounds on the other, are preferably added separately to the starting material which is to be subjected to the chlorination reaction. If desired, however, the above components may be mixed first.

In many cases it may be advantageous to start the reaction with only a part of the total quantity of the mixture, or of the components thereof, and to add the remainder to the reaction mixture during the course of the reaction, either at intervals or continuously.

It is also possible, for example, to add one or more of the nitrogen bases at intervals or continuously to the reaction mixture which contains one or more phosphorus compounds, or add one or more of the phosphorus compounds in the same manner to the reaction mixture containing one or more of the nitrogen bases.

Although any of the customary chlorination techniques using molecular chlorine may be used, the chlorine required for the reaction is preferably applied in gaseous form. Generally, a stream of chlorine gas is introduced into the liquid starting material which contains the catalytic mixture according to the invention.

An excess of chlorine, for example from 1.5 to 2.5 times the theoretical amount, is preferably used. The optimum amount of $Cl_2$ can readily be found by analyzing samples of the reaction mixture during the chlorination. Depending on the reaction temperature and the starting material, the feed rate of chlorine may, for example, vary from 0.2 to 0.7 mole per mole of the starting material per hour.

It is recommended, moreover, to carry out the chlorination at a higher feed rate in the beginning, and to end up with a lower feed rate. Thus, 6-chloro-2-nitrotoluene may advantageously be chlorinated at 180–190° C. at a feed rate of 0.4 to 0.5 mole of $Cl_2$ per mole per hour for about 8 hours, whereupon the chlorine is supplied at a rate of 0.2 to 0.3 mole per mole per hour for about 6 hours. Water formed during the reaction is preferably removed continuously, for example by distillation making use of a water-separating device connected to a cooler.

The chlorination may be carried out either batchwise or continuously. In the latter case, the reactants may be passed in the fluid state in co-current or counter-current streams through a tubular reactor, for example a vertical column.

The reaction temperature should be, as a rule, not lower than 120° C. and not higher than 240° C. Suitable temperatures are in the range 160° to 210° C., preferably 170° C. to 200° C.

The chlorination, according to the process of the present invention, of substituted toluene compounds having a chlorine atom or a nitro group in at least one ortho-position, leads to a product which consists mainly of a compound of the structure

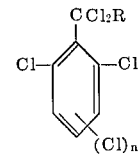

wherein R and $n$ are as described above. Hence, the chlorination is accompanied by replacement of the nitro group, if present, by a chorine atom. In addition, smaller amounts of the corresponding carboxylic acid, the acid chlorine and the nitrile are obtained; the latter compound originates when a nitro group is present in the molecule.

The process is particularly valuable for the preparation of a mixture of 2,6-dichlorobenzal chloride containing, in addition, 2,6-dichlorobenzoic acid, the corresponding acid chloride, and/or 2,6-dichlorobenzonitrile, preferably using 6-chloro-2-nitrotoluene as the starting material.

If desired the crude reaction product obtained according to the process of the invention may be separated into single components by extraction methods well known to the art such as distillation, crystallization, etc. However, it is generally preferred to use the mixture as a whole—possibly after distillation to remove a high-boiling residue—as a starting material for chemical synthesis, in particular for the conversion into the herbicidal derivatives of 2,6-dichlorobenzoic acid.

The novel and useful features of the compounds of the invention are illustrated by the following examples. It should be understood, however, that the examples are merely illustrative and are not to be regarded as limitations to the append claims, since the basic teachings thereof may be varied at will as will be understood by one skilled in the art.

EXAMPLE I

Chlorination of 6-chloro-2-nitrotoluene (CNT)
(see Table 1)

The chlorination of CNT was carried out in a one-litre three-necked round-bottom flask equipped with a mechanical stirrer, a Dean and Stark apparatus connected to a reflux condenser (to remove water formed during the reaction), a thermometer, a gas inlet tube and a dropping funnel.

The reaction mixture (CNT+catalyst) was heated to 180° C., and the chlorine supply connected to the apparatus. The feed rate of chlorine was higher during the first 8 hours than during the subsequent period. The reaction temperature was maintained between 180 and 190° C. over the total reaction time. Water produced during the reaction was collected in the Dean and Stark apparatus together with entrained organic material. These products were continuously removed and the separated organic material recycled to the reactor.

The composition of the reaction product was determined by GLC-analysis.

As appears from Table 1, a maximum yield of convertible products is achieved when the chlorination is carried out in the presence of the catalytic mixture according to the invention. (Experiments C, D, E, F, and G). Experiments F and G are particularly impressive. Experiments A and B which fall outside the scope of the invention claimed are included for comparison only.

4. The process of claim 3 wherein the nitrogen base is present in an amount not exceeding 0.02 mole per mole of starting material present; the phosphorus compound is present in an amount between 0.01 mole to 0.05 mole per mole of starting material; and the temperature is between about 160° C. to 210° C.

5. The process of claim 3 wherein X is chlorine, Y is nitro, R is hydrogen, the nitrogen base is pyridine present in amount between about 0.005 mole to 0.012 mole per mole of starting material; the phosphorus compound is $H_3PO_4$ present in an amount between about 0.002 mole to 0.006 mole per mole of starting material; and the temperature is between about 170° C. to 200° C.

6. The process of claim 5 wherein the molar ratio of pyridine to $H_3PO_4$ is between about 1:10 to 10:1.

7. The process of claim 6 wherein the molar ratio of pyridine to $H_3PO_4$ is between about 2:1 to 4:1.

8. The process of claim 1 wherein the starting material is in the molten state.

9. The process of claim 1 wherein the starting material is in solution with a solvent selected from o-dichloro- TABLE 1.—CHLORINATION OF 6-CHLORO-2-NITROTOLUENE (CNT) AT 180-190° C.
CNT intake: 3.0 mole

| Experiment | A | B | C | D | E | F | G |
|---|---|---|---|---|---|---|---|
| Catalyst, percent molar on CNT: | | | | | | | |
| Pyridine | 1.05 | | 1.05 | 1.05 | 1.05 | 1.05 | 1.05 |
| Phosphorus compound [1] | | $H_3PO_4$: 0.94 | $H_3PO_4$: 0.95 | $PCl_5$: 0.98 | $POCl_3$: 1.0 | $H_3PO_4$: 0.5 | $H_3PO_4$: 0.3 |
| $Cl_2$ feed, mole/mole CNT (hours) [2] | 0.47 (8h) / 0.28 (8h) | 0.48 (8h) / 0.33 (7h) | 0.49 (8h) / 0.38 (2h) | 0.48 (8h) / 0.31 (6h) | 0.48 (8h) / 0.28 (2h) | 0.46 (8h) / 0.27 (6h) | 0.47 (8h) / 0.28 (6h) |
| Reaction time, hours | 16 | 15 | 10 | 14 | 10 | 14 | 14 |
| Products, percent molar on CNT: | | | | | | | |
| 2,6-dichlorobenzal chloride | 52.8 | 51.4 | 62.6 | 60.0 | 64.7 | 54.0 | 60.7 |
| 2,6-dichlorobenzoyl chloride | 10.5 | 3.1 | | | | 20.2 | 7.3 |
| 2,6-dichlorobenzonitrile | 7.0 | 2.5 | 9.4 | 10.4 | 9.4 | 8.5 | 9.0 |
| 2,6-dichlorobenzoic acid | ≈5.0 | 15.0 | 6.4 | 6.8 | <5.0 | 2.5 | 5.8 |
| Total | 75.3 | 72.0 | 78.4 | 77.2 | 78.1 | 85.2 | 82.8 |

[1] In the case of $H_3PO_4$ a 89% w. aqueous solution was used.
[2] The chlorine rate was set at one rate for a period of hours and then set at a lower rate for the remaining hours until the reaction was completed.

We claim as our invention:

1. A process for the preparation of a compound of the structure

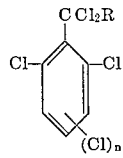

wherein n is 0 or 1 and R is hydrogen, chlorine and lower alkyl of up to 5 carbon atoms, by chlorinating with gaseous chlorine in liquid phase a compound of the structure

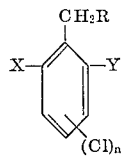

wherein R and n are as described above, X is chlorine or nitro, and Y is chlorine or nitro in the presence of catalytic amounts of one or more hetero-aromatic nitrogen bases selected from the group consisting of pyridine, picoline and quinoline and of one or more pentavalent inorganic phosphorus compounds selected from the group consisting of $PCl_5$, $POCl_3$ and $H_3PO_4$, at a temperature between about 120° C. to 240° C.

2. The process of claim 1 wherein R is hydrogen or chlorine, and n is 0.

3. The process of claim 1 wherein Y is chlorine or nitro, R is hydrogen or chlorine and n is 0.

benzene or 1,2,4-trichlorobenzene wherein the solvent is present in an amount of about 20% by weight of the reaction mixture.

10. The process of claim 3 wherein the chlorination is effected by passing gaseous chlorine through the reaction mixture.

References Cited

UNITED STATES PATENTS

| 2,034,962 | 3/1936 | Smith | 260—651 |
| 2,430,822 | 11/1947 | Nevison | 260—651 |
| 2,449,877 | 9/1948 | Carswell et al. | 260—651 XR |
| 3,223,728 | 12/1965 | Dibella | 260—651 XR |
| 3,253,041 | 5/1966 | Berkowitz et al. | |
| 3,350,467 | 10/1967 | Lasco | 260—651 |
| 3,442,960 | 5/1969 | De Puy et al. | 260—651 |

FOREIGN PATENTS

| 693,199 | 8/1964 | Canada. |
| 695,822 | 10/1964 | Canada. |
| 627,509 | 8/1949 | Great Britain. |
| 953,554 | 3/1964 | Great Britain. |
| 993,204 | 5/1965 | Great Britain. |

OTHER REFERENCES

Vorozhtsov et al.: Translated from Zhur. Obshchei Khim., vol. 31, No. 4, pp. 1222–1226, 1961.

BERNARD HELFIN, Primary Examiner

H. T. MARS, Assistant Examiner

UNITED STATES PATENT OFFICE
CERTIFICATE OF CORRECTION

PATENT NO. : 3,530,192
DATED : September 22, 1970
INVENTOR(S) : Charles F. Kohll et al.

It is certified that error appears in the above-identified patent and that said Letters Patent are hereby corrected as shown below:

Following the fourth line after the title, insert:

"Claims priority, application Great Britain, December 12, 1966, 55,560/66".

Signed and Sealed this nineteenth Day of August 1975

[SEAL]

Attest:

RUTH C. MASON
Attesting Officer

C. MARSHALL DANN
Commissioner of Patents and Trademarks